United States Patent
Fukuda et al.

[11] Patent Number: 5,924,268
[45] Date of Patent: *Jul. 20, 1999

[54] LONGITUDINAL SEALER FOR BAG MAKER-PACKAGING MACHINE

[75] Inventors: Masao Fukuda; Yukio Nakagawa, both of Shiga, Japan

[73] Assignee: Ishida Co., Ltd., Shiga-Ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/881,049

[22] Filed: Jun. 25, 1997

Related U.S. Application Data

[63] Continuation of application No. 08/667,344, May 16, 1996, abandoned.

[30] Foreign Application Priority Data

May 24, 1995 [JP] Japan ................................. 7-149403

[51] Int. Cl.$^6$ ........................................................ B65B 9/06
[52] U.S. Cl. ................................. 53/550; 53/551; 53/375.9
[58] Field of Search ......................... 53/550, 551, 552, 53/553, 554, 555, 375.8, 375.9

[56] References Cited

U.S. PATENT DOCUMENTS

| | | | |
|---|---|---|---|
| 4,035,984 | 7/1977 | Gerlach et al. | 53/550 |
| 4,073,116 | 2/1978 | Glover | 53/550 |
| 4,102,111 | 7/1978 | Nack et al. | 53/550 |
| 4,712,357 | 12/1987 | Crawford et al. | 53/550 |
| 4,829,746 | 5/1989 | Schmidt et al. | 53/551 |
| 5,247,781 | 9/1993 | Runge | 53/550 |
| 5,279,098 | 1/1994 | Fukuda | 53/551 |

*Primary Examiner*—James F. Coan
*Assistant Examiner*—Gene L Kim
*Attorney, Agent, or Firm*—Majestic, Parsons, Siebert & Hsue P.C.

[57] ABSTRACT

As a cylindrically formed web of thermoplastic bag-making material is transported longitudinally along a path at a specified speed, a longitudinal sealer with a heater is compressed against and over portions of the material parallel to the path to effect longitudinal sealing. The longitudinal sealer is moved in the meantime along the path at a greater speed in the range of 1.05 to 1.30 times the specified speed of motion of the material such that generation of V-shaped wrinkles known as the chevrons on both sides of the sealed area can be prevented.

6 Claims, 1 Drawing Sheet

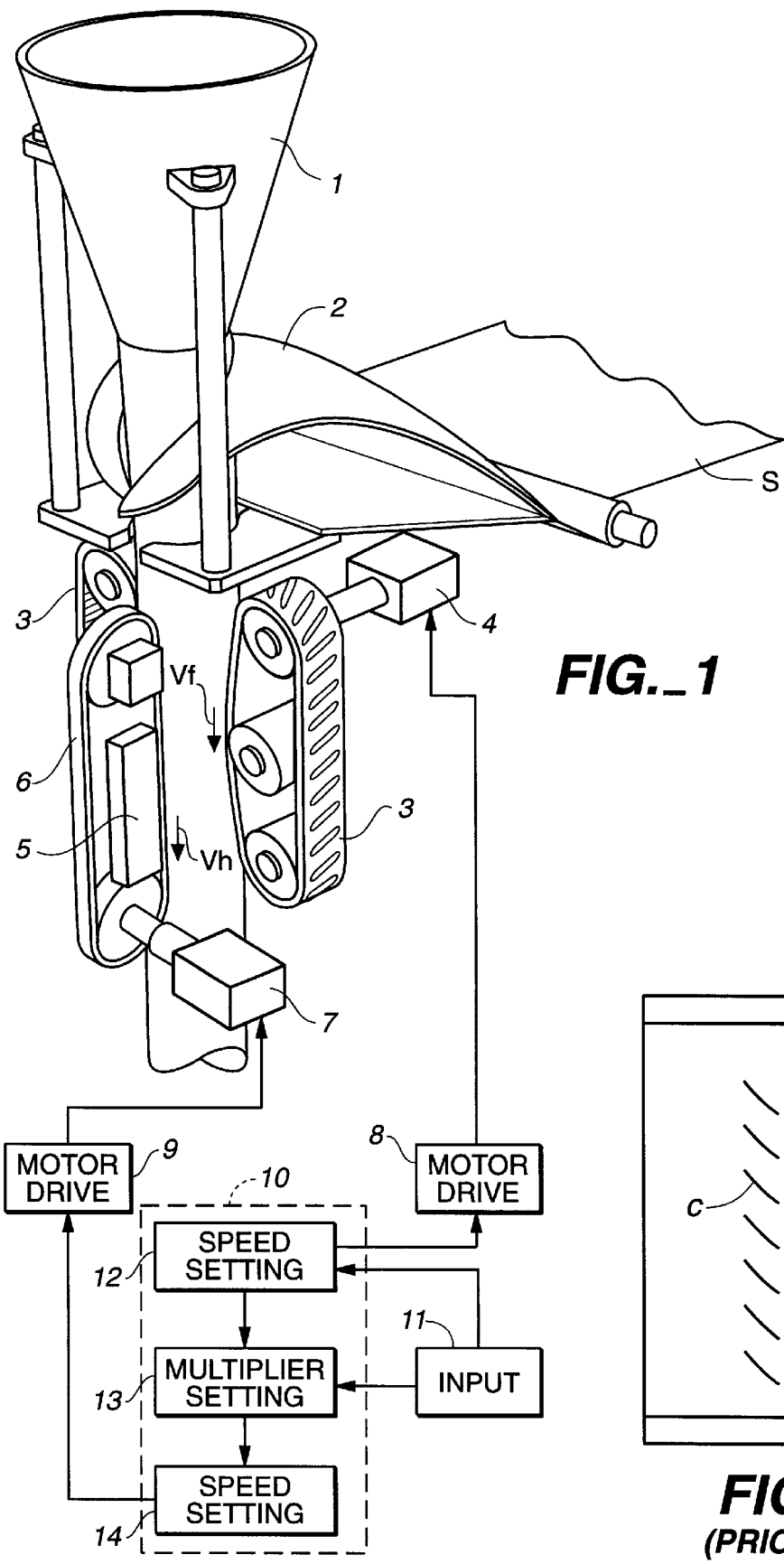
FIG._1
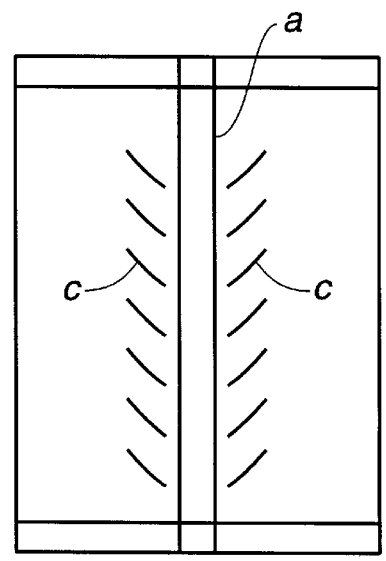
FIG._2
(PRIOR ART)

5,924,268

LONGITUDINAL SEALER FOR BAG MAKER-PACKAGING MACHINE

This is a continuation of application Ser. No. 08/667,344 filed May 16, 1996, now abandoned.

BACKGROUND OF THE INVENTION

This invention relates to a mechanism for longitudinally sealing an elongated bag-making material without leaving unsightly wrinkles thereon.

A so-called vertical pillow type packaging machine is a kind of bag maker-packaging machine adapted to bend a web of thermoplastic bag-making material (herein referred to as "the film") into a cylindrical shape, to use a heater for longitudinally sealing together the mutually overlapping side edge parts of the film while the cylindrically formed film is being pulled along the outer surface of a so-called filling cylinder through which articles to be packaged are dropped from above, and then to use another heater to seal the cylindrically formed film transversely to the direction of its motion, as disclosed, for example, in Japanese Patent Publication Tokkai 5-77805, such that the filling of the materials and making of packages can be carried out in one continuous series of operations.

The thermoplastic bag-making material used in this type of package production is usually of a layered structure. In the middle is a vapor deposited aluminum layer, or a printed layer, having on the side of its front surface a polypropylene layer of the so-called OPP type which has lustre but is poor in expandability and on the side of its back surface a so-called CPP type polypropylene layer which seals well but tends to shrink when heated. When heat is applied on such a multi-layered film, wrinkles with V-shaped bars, sometimes called "the chevrons", are formed as indicated by letter c in FIG. 2 on both sides of the seal area indicated by letter a because the front surface and the back surface of the film F have different expansion characteristics. As a result, the printed surface becomes deformed, affecting adversely the merchantability of the product.

SUMMARY OF THE INVENTION

It is therefore an object of this invention to provide, in view of the above, an improved longitudinal sealer for a bag maker-packaging machine with which a film of the type described above can be longitudinally sealed without leaving any V-shaped wrinkles along the longitudinally extending sealed area.

A longitudinal sealer for a bag maker-packaging machine embodying this invention, with which the above and other objects can be accomplished, may be characterized as being placed on the path along which the film is transported at a specified speed and comprising a sealing means such as a belt heated by a heater adapted to be compressed against the film for thermally sealing together its specified portions and a driving mechanism for simultaneously causing the sealing means to move along the path at a greater speed than the specified speed of film transportation.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a schematic diagonal view of a bag maker-packaging machine incorporating a longitudinal sealer embodying this invention with its control unit shown as a block diagram; and FIG. 2 is a plan view of a film surface sealed by a prior art longitudinal sealer.

DETAILED DESCRIPTION OF THE INVENTION

FIG. 1 shows a vertical pillow type bag maker-packaging machine incorporating a longitudinal sealer embodying this invention, inclusive of its control unit 10, adapted to bend a flexible thermoplastic bag-making material ("the film") s into a cylindrical shape by means of a former 2 disposed below a hopper 1 and to pull down the cylindrically formed film s towards a transverse sealer (not shown) by means of a pair of pull-down belts 3 disposed below the former 2 and on opposite sides of the path of the film s while the mutually overlapping side edges of the film s are thermally sealed longitudinally by a longitudinal seal belt 6 provided with a seal jaw 5 for heating the seal belt 6. The pull-down belts 3 are driven by a servo motor 4, their speed being indicated by symbol $v_f$. The longitudinal seal belt 6 is driven by another servo motor 7, its speed being indicated by symbol $v_h$. As shown in FIG. 1, the pull-down belts 3 and the longitudinal sealer composed essentially of the seal jaw 5 and the seal belt 6 are at about the same height, that is, at about the same position along the travel path of the films. According to this invention, motor driving means 8, 9, adapted to control the motion of the servo motors 4, 7, respectively, are themselves controlled by the control unit 10 such that $v_h$ is greater than $v_f$ by 5% to 30%.

The control unit 10 includes a first speed setting means 12, a multiplier setting means 13 and a second speed setting means 14. The rotary speed of the servo motor 4 for driving the pull-down belts 3 is determined by the first speed setting means 12 in response to the user's choice received through an input means 11, which is external to the control unit 10, and the motor driving means 8 serves to drive the servo motor 4 at this rotary speed determined by and received from the first speed setting means 12 such that the pull-down belts 3 will pull down the film 2 at the speed $v_f$ selected by the user.

The input means 11 is further adapted to allow the user to select and specify a multiplier within a range of 1.05 to 1.30, representing the ratio $v_h/v_f$. This specified multiplier is received by the multiplier setting means 13, and the second speed setting means 14 serves to determine, based on data received from the first speed setting means 12 and the multiplier setting means 13, the rotary speed by which the motor driving means 9 should drive the associated servo motor 7 such that the seal belt 6 will move with the speed $v_h$ according to the multiplier selected by the user.

In summary, the film s, after being bent into a cylindrical form by the former 2, is pulled downward towards the transverse sealer by the pull-down belts 3 at the selected speed of $v_f$, while, at the same time, its seal areas are compressed by the seal belt 6 which moves at a faster speed $v_h$, 1.05 to 1.30 times greater than $v_f$. As a result, the CPP layer on the front surface of the film s does not shrink, when heated by the heat from the longitudinal seal jaw 5, because it is being subjected to a stronger downward force from the faster-sliding seal belt 6 and can maintain the same length as the other layers. Thus, the appearance of the chevrons can be prevented according to this invention.

Although this invention has been described above with reference to a vertical pillow type bag maker-packaging machine, it goes without saying that this invention is equally well applicable to other types of bag makers such as those adapted to longitudinally seal the packaging material during the process of its continuous transportation.

What is claimed is:

1. A longitudinal sealer for a bag maker-packaging machine adapted to transport an elongated web of thermoplastic bag-making material along a path at a specific speed of transportation, said longitudinal sealer comprising:

a pull-down belt for pulling said web along said path at said specific speed;

a sealing device approximately at a same position as said pull-down belt along said path for thermally sealing together portions of said web of bag-making material parallel to said path; and a driving mechanism for causing said sealing device to move along said path at a greater speed than said specific speed of transportation while said sealing device seals together said portions of said web.

2. The longitudinal sealer of claim 1 wherein said greater speed is 1.05–1.30 times said speed of transportation.

3. The longitudinal sealer of claim 1 wherein said greater speed is adjustably variable.

4. The longitudinal sealer of claim 2 wherein said greater speed is adjustably variable.

5. The longitudinal sealer of claim 1 wherein said sealing device comprises an endless belt and a heater for heating said endless belt, and said driving mechanism includes a servo motor.

6. The longitudinal sealer of claim 5 further comprising a control unit which causes said bag making material to move at said speed of transportation and said endless belt of said sealing device to move at said greater speed.

* * * * *